United States Patent
McCabe et al.

(10) Patent No.: US 10,599,740 B1
(45) Date of Patent: Mar. 24, 2020

(54) PROGRAM CODE STREAMING

(71) Applicant: Instart Logic, Inc., Palo Alto, CA (US)

(72) Inventors: Francis G. McCabe, Cupertino, CA (US); Mohammad H. Reshadi, Sunnyvale, CA (US)

(73) Assignee: Instart Logic, Inc., Palo Alto, CA (US)

( * ) Notice: Subject to any disclaimer, the term of this patent is extended or adjusted under 35 U.S.C. 154(b) by 681 days.

(21) Appl. No.: 14/731,958

(22) Filed: Jun. 5, 2015

Related U.S. Application Data

(60) Provisional application No. 62/048,681, filed on Sep. 10, 2014.

(51) Int. Cl.
*G06F 17/21* (2006.01)
*G06F 16/957* (2019.01)
*G06F 17/22* (2006.01)
*H04L 29/06* (2006.01)

(52) U.S. Cl.
CPC ...... *G06F 16/9574* (2019.01); *G06F 17/2247* (2013.01); *H04L 67/42* (2013.01)

(58) Field of Classification Search
CPC .... G06F 17/24; G06F 17/25; G06F 17/30902; G06F 17/2247; G06T 11/60; A63F 2300/5553; A63F 2300/6623; H04L 67/42
USPC ................. 715/201, 202, 230, 255
See application file for complete search history.

(56) References Cited

U.S. PATENT DOCUMENTS

| | | | | |
|---|---|---|---|---|
| 2011/0078555 | A1* | 3/2011 | Crockett | G06F 16/9574 715/234 |
| 2011/0167332 | A1* | 7/2011 | Nickas, Jr. | G06F 17/2264 715/234 |
| 2014/0281905 | A1* | 9/2014 | Burckart | G06F 17/30893 715/234 |
| 2016/0041826 | A1* | 2/2016 | Ben-Yair | G06F 8/72 717/110 |
| 2017/0264701 | A1* | 9/2017 | Wei | H04L 67/2814 |

OTHER PUBLICATIONS

Livshits et al. "Doloto: Code Splitting for Network-Bound Web 2.0 Applications". 2008.

* cited by examiner

*Primary Examiner* — Andrew R Dyer
*Assistant Examiner* — Jenq-Kang Chu
(74) *Attorney, Agent, or Firm* — Van Pelt, Yi & James LLP

(57) ABSTRACT

A first request for a web program is received. A profiling version of the web program is provided in response to the first request for the web program. The profiling version of the web program identifies each unique function of the web program using a corresponding unique replacement identifier. The web program is analyzed to identify a portion of the web program to be replaced with a reference that corresponds to a location where the identified portion can be obtained. A reduced version of the web program without the identified portion is generated by replacing the identified portion with at least the reference. A second request for a web program is received. The reduced version of the web program is provided in response to the second request for the web program.

22 Claims, 10 Drawing Sheets

```
<html>
  <head>
    <title>Welcome</title>
  </head>
  <body>
    <h1>HelloWorld </h1>
        .
        .
        .
    <img src = "url for image"/>
    <video>
        <source src = "url for video" type = "video/ogg"  />
    </video>
    <script type = "text/javascript">
    <!--script
    *** Some javascript code is placed here ***
    -- >
    </script>

<script src = "myScript.js">
    </script>

</body>
</html>
```

- Text — `<h1>HelloWorld </h1>`
- Image — `<img src = "url for image"/>`
- Video — `<source src = "url for video" type = "video/ogg" />`
- Inline JavaScript — the `<script type = "text/javascript"> ... </script>` block
- External JavaScript — the `<script src = "myScript.js"> </script>` block

PROGRAM CODE STREAMING

CROSS REFERENCE TO OTHER APPLICATIONS

This application claims priority to U.S. Provisional Patent Application No. 62/048,681 entitled PROGRAM CODE STREAMING filed Sep. 10, 2014 which is incorporated herein by reference for all purposes.

BACKGROUND OF THE INVENTION

Typically, a web browser needs to receive and process various resources to render a webpage. Due to the large amount of content received, the startup wait time experienced by an end-user of a browsing session may be significant, especially in higher latency networks, such as cellular networks. As webpages are becoming more complex, the amount of web program code to be processed has been increasing. Because program code of a webpage can modify the HTML of a webpage, often the web browser is unable to perform other processing until the program has been completely received and processed. Additionally, often over generalized program code included/referenced/utilized by a webpage is not utilized in the context that it is deployed. Therefore, improved techniques for delivering, receiving and processing program code is desirable.

BRIEF DESCRIPTION OF THE DRAWINGS

Various embodiments of the invention are disclosed in the following detailed description and the accompanying drawings.

FIG. 2 is a diagram illustrating an embodiment of an HTTP response 200 returning an HTML file.

DETAILED DESCRIPTION

Figure 1:
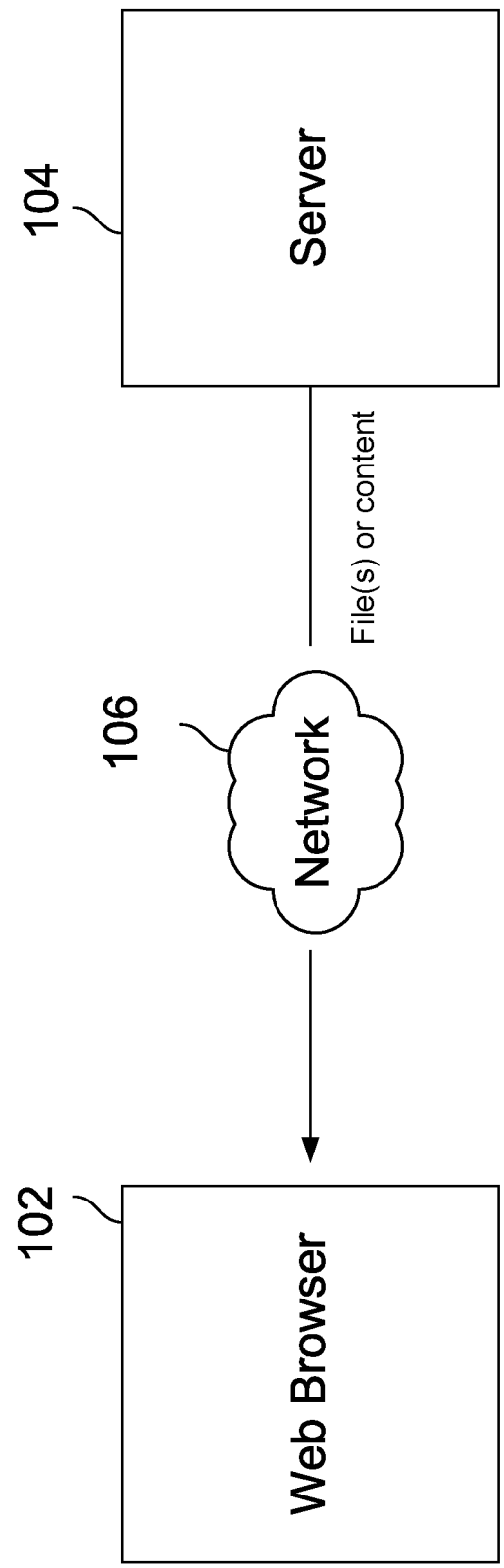
FIG. 1 is a block diagram illustrating an embodiment of a web browser accessing webpages and other information (e.g., webpages and other information for a web application) through a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Reducing a web program is disclosed. For example, size of JavaScript content to be provided for a webpage is reduced. Examples of the web program include program code, script, application, complied content, bytecode, and any other programmatic content associated with the web/Internet. A specific example of the web program includes JavaScript. A function of the web program may be reduced. The function of the web program may be a method, a procedure, a routine, a subprogram, and/or a callable unit of the web program.

In some embodiments, a web page references a number of related resources that are loaded by a browser when the user selects a particular web address (or URL). In some embodiments, a resource is an entity that has a name (e.g., URL), a representation (e.g., a particular set of data that represent the current state of the resource) referred to as a file and a transducer (e.g., a system—typically incorporating the browser and a component called a web server—that can be used to deliver representations of the resource based on its URL). A typical web page may have many resources and several kinds of resources.

FIG. 1 is a block diagram illustrating an embodiment of a web browser accessing webpages and other information (e.g., webpages and other information for a web application) through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

In some embodiments, the resources referenced by a web page as accessed by web browser 102 are described using resource-specific languages. For example, the main skeleton or structure of the web page is normally described in the Hypertext Markup Language (HTML). Other kinds of resource may include program scripts, which may be written in JavaScript; resources that define the layout and presentation style—which may be described using Cascading Style Sheets (CSS)—special fonts; images—which may be represented in a variety of formats including JPEG, PNG and TIFF—and video elements—which may be represented in formats such as MPEG. JavaScript is an example of the various languages for describing program resources in a web page. Note that the examples of HTML, JavaScript and so forth are selected for illustrative purposes only; accordingly, the present application is not limited to these specific examples.

FIG. 2 is a diagram illustrating an embodiment of an HTML file. To display the webpage, web browser 102 sends a Hypertext Transfer Protocol (HTTP) request message to server 104 requesting the HTML webpage file. Server 104 returns the requested HTML webpage file in an HTTP response message to web browser 102. Web browser 102 then parses the received webpage and begins to process and render the webpage. The use of HTTP here is for illustrative purposes only and the present application is not limited to its use. Furthermore, HTTP may be used for many kinds of resource, including JavaScript programs.

As shown in FIG. 2, the HTML file may include text, references to dependent resources, programs, scripts, and the like. Examples of dependent resources include images, videos, and audio clips. These dependent resources are resources that need to be separately transferred from server 104 or from other servers to web browser 102. For example, as shown in FIG. 2, the list of dependent resources includes an image, a video and several examples of JavaScript. To display the image on the webpage, web browser 102 sends a separate HTTP request message to the network—using the URL to identify the required image, and the image will be returned in a separate HTTP response message from the network.

A web page may include one or more programs/scripts for making the webpage dynamic and interactive. As shown in FIG. 2, the <script> tags (i.e., <script> and </script> tags) are used to define such scripts. The scripts themselves are usually written using JavaScript. A JavaScript may be either inline or external. For inline scripts, the JavaScript code is directly embedded and integrated into the HTML code as shown in FIG. 2. JavaScript code may also be placed in external resources. A reference to an external JavaScript file may be inserted into the HTML file by specifying a URL for the JavaScript file in the "src" attribute of the <script> tag. As part of the process of displaying a web page, the browser will download such external JavaScripts from the network using HTTP requests and will then execute the downloaded scripts.

Dependent resources can be large in size; hence, the network load and the time required to download the dependent resources can be significant. The content corresponding to code of programs on a webpage can be significant. Reducing the amount/size of programs of a webpage can yield savings in network bandwidth utilization and performance improvements.

Transferring JavaScript programs across the network can consume a significant amount of computing resources, and the end-user may experience a delay until such scripts or certain portions of them are loaded and executed. Because scripts are often used to handle dynamic actions or respond to end-user actions, different portions of the scripts may only need to be executed at certain times. Therefore, reprioritization of the execution of certain components of the scripts can result in more efficient utilization of the limited amount of computing resources. As will be described in greater detail below, instead of loading and executing a JavaScript program as a single monolithic block of code, the semantics of the web program may be exploited to reorganize and partially load the web program as needed.

Figure 3:
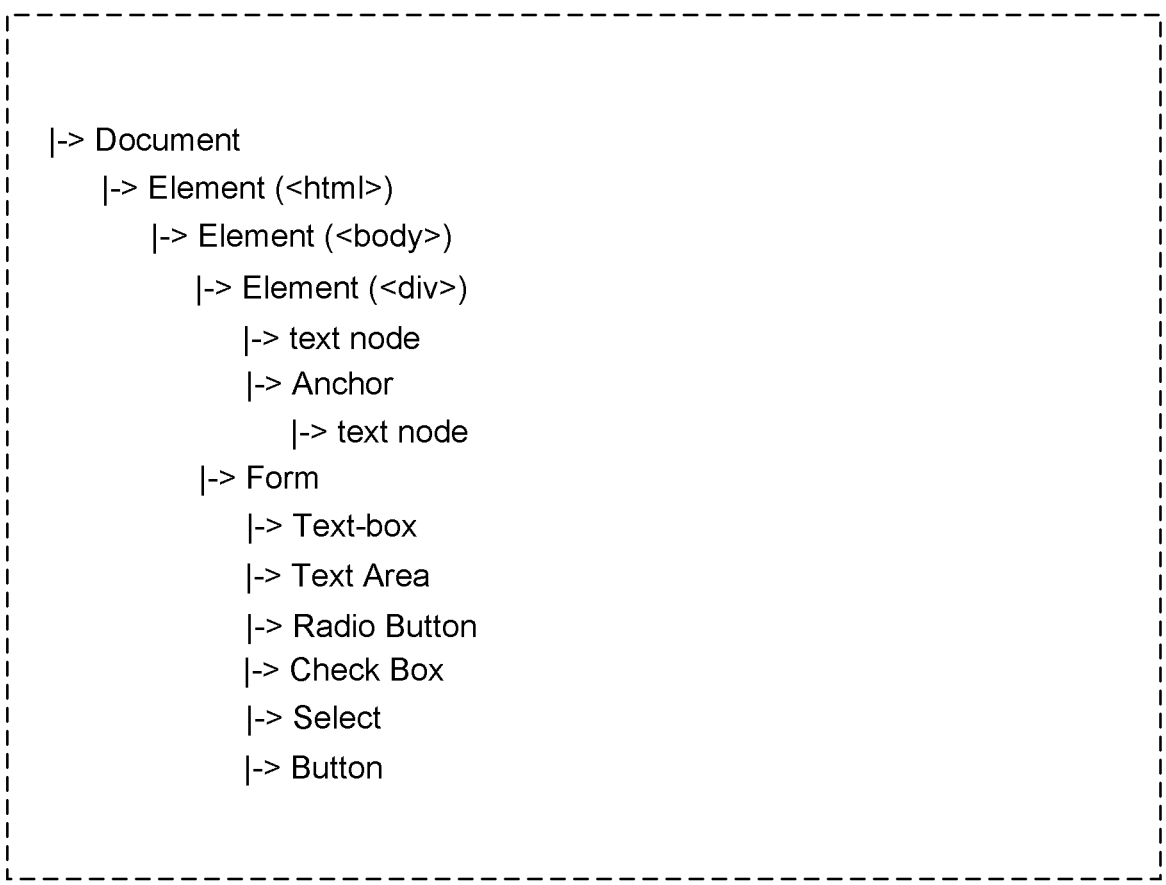
FIG. 3 is a diagram illustrating an embodiment of a DOM tree.

FIG. 3 is a diagram illustrating an embodiment of an example DOM tree. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

Figure 4:
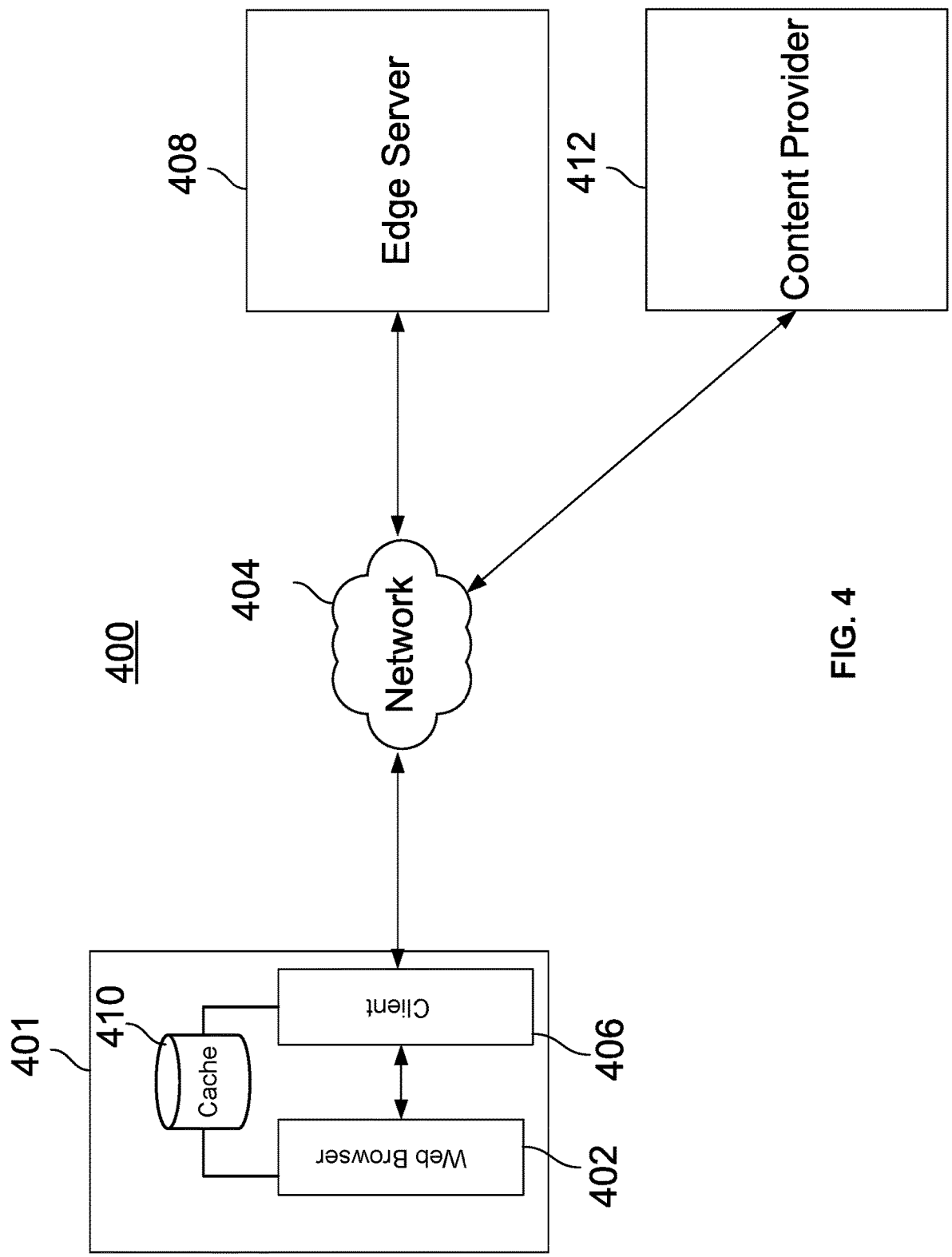
FIG. 4 is a block diagram illustrating an embodiment of an optimized content delivery environment.

FIG. 4 is a block diagram illustrating an embodiment of an optimized content delivery environment. Client-server system 400 may be utilized to efficiently deliver content to a client. Client-server system 400 may be utilized to optimize delivery of web programs. In some embodiments, client-server system 400 is utilized to virtualize a DOM of a web browser. Virtualization of a DOM of a web browser allows the client-server system to take control of the DOM for different kinds of optimizations, while keeping the virtualization transparent to the web browser. Client device 401 includes web browser 402, nanovisor 406, and cache 410. For example, an end-user may utilize client device 401 to access desired network/Internet content. Examples of client device 401 include a desktop computer, a laptop computer, a personal computer, a mobile device, a tablet computer, a smartphone, a wearable computer, and other computing devices.

A web browser 402 accesses webpages and other information through a network 404. When web browser 402 sends network messages onto network 404 that are related to the downloading of webpages or other information and resources, the messages may be (1) intercepted and processed by nanovisor 406, (2) directly received and then processed by edge server 408 supporting virtualization, or (3) provided directly to a content provider such as content provider 412. In some embodiments, webpages or other information and resources related to the webpages that are sent to web browser 402 may be intercepted, filtered, processed, or provided nanovisor 406 or edge server 408 (e.g., content from content provider 412 for web browser 402 is routed via nanovisor 406 and/or edge server 408). In addition, method API calls by web browser 402 or any JavaScript code to manipulate the objects in a DOM tree may be intercepted, processed, or modified by nanovisor 406. Nanovisor 406 may also manipulate the DOM tree by making the appropriate method API calls to the DOM tree. As a result, nanovisor 406 and edge server 408 together create a virtualization engine for the DOM of web browser 402. The virtualization engine may access and manipulate a DOM tree, including the creation, deletion, or update of nodes within the DOM tree. In various embodiments, use of nanovisor 406 and/or virtualization of the DOM is optional.

One or more of the following may be included in network 404: a direct or indirect physical communication connection, mobile communication network, Internet, intranet, Local Area Network, Wide Area Network, Storage Area Network, a wireless network, a cellular network, PTSN, and any other form of connecting two or more systems, communication devices, components, or storage devices together. Although example instances of components have been shown to simplify the diagram, additional instances of any of the components shown in FIG. 4 may exist. Components not shown in FIG. 4 may also exist.

Edge server 408 may be a proxy server, cache server, and/or other content processing server. In some embodiments, a request for content made by client 401 and/or web browser 402 is received at edge server 408. For example, the request for content (e.g., webpage, dependent resource, etc.) of content provider 412 (e.g., origin server) is received at edge server 408. Edge server 408 may provide the requested content by requesting and receiving the content from content provider 412 and/or from a cache of server 408. In some embodiments, the Edge server 408 may perform additional processing on the content provided; for example the edge server 408 may reduce the size of the content, it may change the form of the resource and/or it may modify the content so as to require multiple further requests from the browser.

In some embodiments, Edge server 408 may process JavaScript content, for example to reduce the size of the requested content by generating a version of the web program where one or more of its portions are replaced with a corresponding reference to a location where the replaced portion may be obtained. For example, code of one or more functions in the requested content may be removed and replaced with code that obtains the replaced code as needed from a network location. The as needed subsequent requests for the replaced portions (e.g., code portions) of the requested content may be received and served by edge server 408 and/or another server.

In some embodiments, rather than provide the missing replaced code portions individually as requested, the missing portions are grouped and provided together as a group. For example, when one missing replaced portion of a group is requested, all portions included in the entire group are provided. By grouping together the missing replaced portions that are likely to be utilized together, the performance improvements may be gained due to the reduction in the overhead of requesting, receiving, and processing separate requests as compared to the single request for the entire group. In some embodiments, the code portions included in a group are likely to be requested/utilized within a short time span. For example, when a request for a web program is received by server 408, the server provides a version of the web program that tracks execution of the web program to identify groupings of content portions (e.g., groupings of functions) that are likely first invoked within the same time span.

Figure 5:
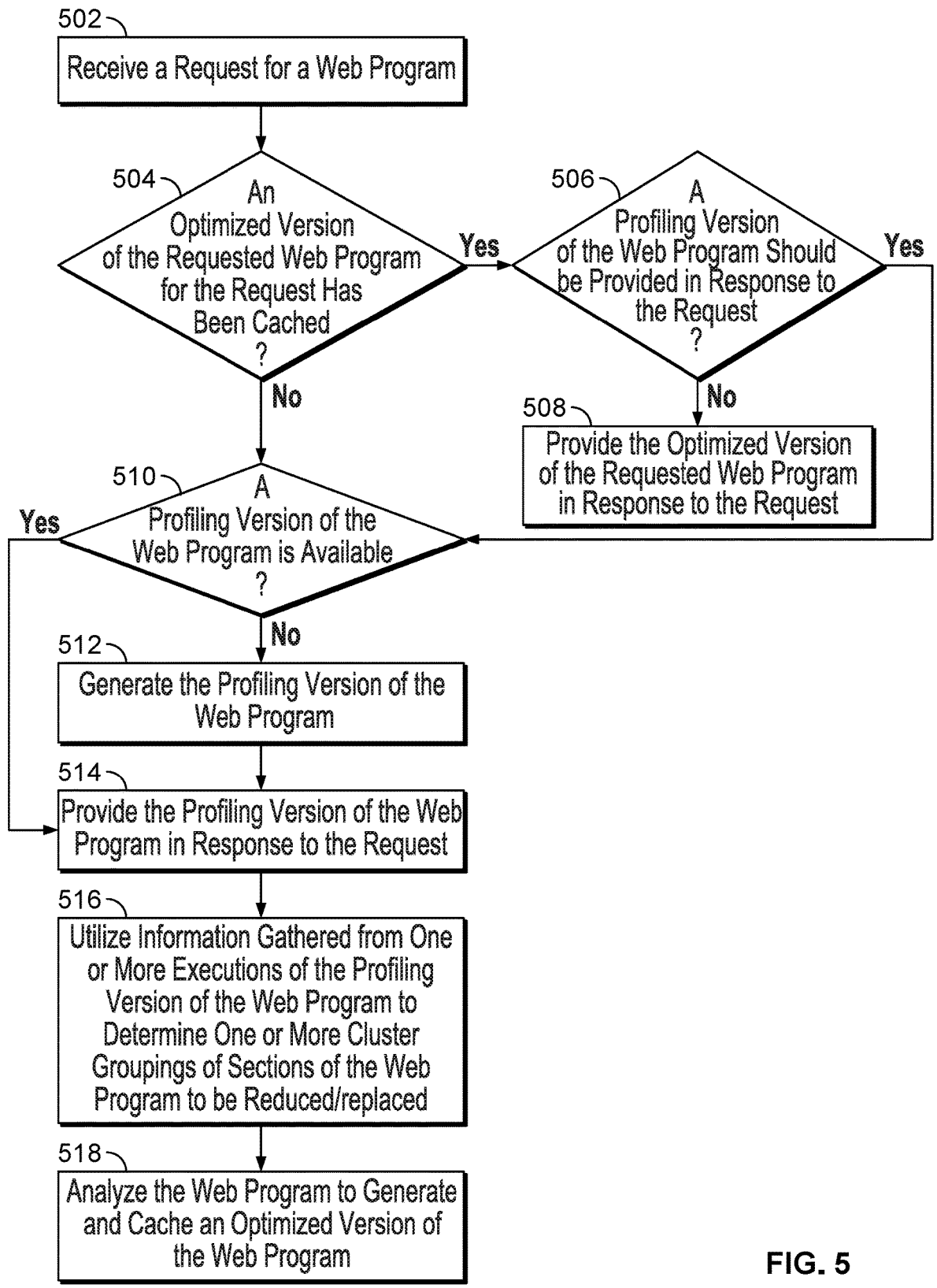
FIG. 5 is a flowchart illustrating an embodiment of a process for processing a request for a web program.

FIG. 5 is a flowchart illustrating an embodiment of a process for processing a request for a web program. In some embodiments, the process of FIG. 5 is at least in part, implemented on server 104 of FIG. 1 and/or edge server 408 of FIG. 4.

At 502, a request for a web program is received. In some embodiments, receiving the request includes receiving at server 408 from client 401 of FIG. 4 a request for a webpage. In some embodiments, the request is a request for a web program dependent resource identified in web content (e.g., external web script linked in a webpage. In some embodiments, the request for the web program is a request for the web program from an application (e.g., mobile application). Examples of the web program include program code, script, application, complied content, bytecode, and any other programmatic content associated with a network and/or the web/Internet. A specific example of the web program includes external JavaScript.

At 504, it is determined whether an optimized version of the requested web program for the request has been cached. For example, the optimized version includes a reduced version of the web program that has been processed to replace one or more portions of the web program with stub code that obtains the original code as needed. In some embodiments, the request identifies the web program by a unique location identifier (e.g., uniform resource locator (URL), uniform resource identifier (URI), etc.) and determining whether the version of the requested web program has been cached includes determining whether an optimized version identified by the location identifier has been cached.

In some embodiments, determining whether the optimized version of the requested web program has been cached includes determining whether a specific matching optimized version of the web program has been generated and cached. For example, multiple optimized versions of the web program may exist for different platforms (e.g., operating system, device, etc.) and/or requesting/rendering programs (e.g., different web browser). In some embodiments, determining whether the optimized version of the requested web program has been cached includes determining whether a specific optimized version of the web program determined for the platform and/or requesting program has been generated and cached and obtaining the specific optimized version from a plurality of optimized versions of the web program. For example, the specific optimized web program is identified by a combination of its URI, platform of the requestor, and the requesting program of the request.

If at 504 it is determined that the optimized version of the requested web program for the request has been cached, at 506 it is determined whether a profiling version of the web program should be provided in response to the request to profile/analyze the execution of the web program to update an optimization of the web program. For example, optimization of the web program may be updated periodically to adapt to any changes in the execution of the web program. An already optimized web program may be selected to be optimized again randomly, periodically (e.g., based on time period and/or number of times requested/utilized), and/or dynamically (e.g., dynamically detect that prior optimization is not optimal). For example, the profiling version of the web program is provided periodically on a predetermined time interval.

If at 506 it is determined that the profiling version of the web program is not to be provided in response to the received request, at 508 the optimized version of the requested web program is provided in response to the request. In some embodiments, the optimized version has been cached at a cache and the cached optimized version of the web program appropriate for the request is provided. For example, an optimized version of the web program cached by edge server 408 of FIG. 4 is provided. In some embodiments, the optimized version is a reduced version of the web program.

If at 506 it is determined that the profiling version of the web program is to be provided in response to the request, the process proceeds to 510.

If at 504 it is determined that the optimized version of the requested web program for the request has not been cached, or if at 506 it is determined that even if an optimized version has been cached, a profiled version of the program should be delivered, at 510 it is determined whether a profiling version of the web program is available. For example, if the web program has been previously optimized, the profiling version utilized to profile and track the execution of the web program may have been already generated and saved/cached.

If at 510 it is determined that the profiling version of the web program is not available, at 512, the profiling version of the web program is generated. In some embodiments, the profiling version is generated by inserting code into the web program that allows tracking and profiling of the execution of the web program. For example, the profiling version tracks which and when functions of the web program are executed.

At 514, the profiling version of the web program is provided in response to the request. In some embodiments, the profiling version tracks which and when functions of the web program are first invoked and periodically reports the tracked/profiled information back to a processing server that utilizes the information to optimize the web program. The profiling version may be provided to other requestors in response to a request for the web program and information gathered from execution of the profiling version by various user systems is utilized to optimize the web program.

At 516, information gathered from one or more executions of the profiling version of the web program is utilized to determine one or more cluster groupings of sections of the web program to be reduced/replaced. For example, code contents of program functions that are to be replaced are grouped according to which functions are likely to be utilized temporally close to one another. For example, when code contents of a reduced function belonging to a specific cluster group are requested at a later point when executing an optimized version of the web program, code contents of all functions belonging to the entire cluster group may be provided so that the requestor does not have to make another request for another function belonging to the same cluster group.

In some embodiments, the cluster groupings of sections are specific to a particular subset of end-users. This subset may be characterized by operating system platform, requesting program (user agent), and/or other characteristics of the end-user population. This characterization may result in different cluster groupings as the different kinds of population have different temporal correlations of function usage. For example, functions that are specific to browser A and not be needed by end-users who use browser B. Further examples of end-user population characterizations include geo-classification (end users in geo region A may use different functions than those in geo region B). In some embodiments, a particular optimized version references a particular set of section groupings. In some embodiments, a single optimized version is utilized for the web program and a particular set of cluster groupings is dynamically obtained and utilized for a particular client based on the characteristics of the client. In some embodiments, step 516 may be performed periodically to update the cluster groupings using updated information received from profiling versions of the web program. In some embodiments, step 516 may be performed again dynamically when updated information is received from a profiling version of the web program.

At 518, the web program is analyzed to generate and cache an optimized version of the web program. In some embodiments, the generated optimized version of the web program is specific to a particular platform and/or requesting/rendering program. In some embodiments, generating the optimized version includes replacing one or more sections of the web program with a corresponding reference where the corresponding replaced section can be obtained. For example, code contents of functions of the web program are replaced with corresponding references. By replacing the sections, the size of the web program may be reduced in size, allowing faster delivery and processing of the web program. In some embodiments, the optimized version is generated based at least in part on a cluster grouping determined in 516.

Figure 6:
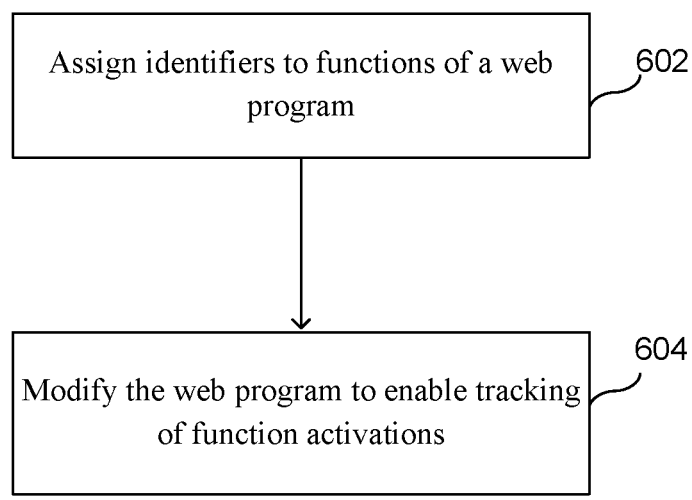
FIG. 6 is a flowchart illustrating an embodiment of a process for generating a profiling version of a web program.

FIG. 6 is a flowchart illustrating an embodiment of a process for generating a profiling version of a web program. In some embodiments, the process of FIG. 6 is at least in part implemented on server 104 of FIG. 1 and/or edger server 408 of FIG. 4. In some embodiments, the process of FIG. 6 is included in 512 of FIG. 5.

In some embodiments, when the profiling version of the web program is executed, information about functions of the web program is profiled/tracked. The purpose of this profiling may be to both determine which functions are activated at all in a JavaScript program and may be to determine potential temporal correlations of function activations. In an optimized version of the web program, the code contents of functions may be removed and replaced with a reference where the contents may be obtained as needed. However, retrieving code content of each function as needed independently may result in a large number of requests that may materially impact performance. By grouping together functions that are likely utilized together into a group, a single request for contents of a function of the group can return contents of all of the functions of the group that likely would have been subsequently requested anyway. In order to determine the functions that belong to each group, information gathered from the profiling version may be utilized.

In some embodiments, for a given function, two types of information are desired: whether or not it has been activated and at when it was first invoked. By tracking when functions are first activated, a temporal correlation between function utilization may be determined. A function may be activated by invoking it; a function may also be activated by performing certain operations on the function; for example, JavaScript allows function source code to be inspected and such an inspection of the function counts as an activation of the function; although it does not involve invoking the function. The temporal correlation may be utilized as a substitute for causal dependency in order to minimize the total number of round trips to access the web program source that has been removed from an optimized version of the web program. For example, in response to a request for contents of a function of an optimized version of the web program, the requestor is provided not only the contents of the requested function but also all the contents of functions temporally related to the requested function.

At 602, identifiers are assigned to functions of a web program. In some embodiments, the web program is the web program requested in 502 of FIG. 5. In some embodiments, assigning the identifiers includes identifying functions of the web program and assigning a unique identifier to each function. For example, although functions of the web program may have a programmer specified function identifier, some functions might not have a programmer specified function identifier. In order to reliably identify each function of the web program, one or more functions of the web program may be assigned a unique numeric identifier. In some embodiments, the assigned identifier is unique for a given JavaScript file. In some embodiments, the assigned identifiers may be unique across different JavaScript files. For example, the assigned identifier may be unique across all web programs that have been analyzed by a 408 server in FIG. 4.

At 604, the web program is modified to enable tracking of function activations. In some embodiments, a modified version of the web program is stored/cached as the profiling version of the web program. In some embodiments, the modified version of the web program is provided in 514 of FIG. 5. In some embodiments, modifying the web program includes inserting code to one or more functions of the web program (e.g., every function of the web program) to track when the function has been first invoked/called/activated. For example, when a function is first invoked, a timestamp and the identifier assigned in 602 are recorded.

In some embodiments, an extra code is inserted at the beginning of each function that records the activation. For example, the function:

function alpha( ){return beta( );} where the function identifier for function "alpha" is "12", can be modified as:

function alpha( ){updateRef(12); return beta( );}

The "updateRef" function saves a current timestamp to a data structure at the time the function is invoked/activated for the first time.

An example of the "updateRef" function is given below, where "now" is a function that returns a current timestamp value.

function updateRef(funId){
  if(!refArray[funId])
  refArray[funId]=now( );
}

When this "updateRef" function is invoked, the "refArray" array storing the timestamp of the function identified by "funId" will only be updated once in the first invocation to replace the initial null value of the "refArray" element with the timestamp.

In some embodiments, the web program is modified to include code that will report collected data to a server. For example, the collected data stored in "refArray" of the previous example will be reported to server 104 of FIG. 1 and/or edge server 408 of FIG. 4. The collected information may be provided periodically and/or dynamically. In some embodiments, collected information is provided by the client to the server periodically at a gradually increasing time interval based on an exponential back off. For example, collected data may be provided after 2, 4, 8 and 16 seconds from the start of execution of the JavaScript and so on until a reasonable upper limit is reached. In some embodiments, this limit is set programmatically or is set to some fixed time. In some embodiments, the collected data is provided with an identifier that identifies the sender of the data. For example, a same unique randomly generated identifier of a sender is provided along with the collected data to identify the unique execution instance of the profiling version of the web program.

Figure 7:
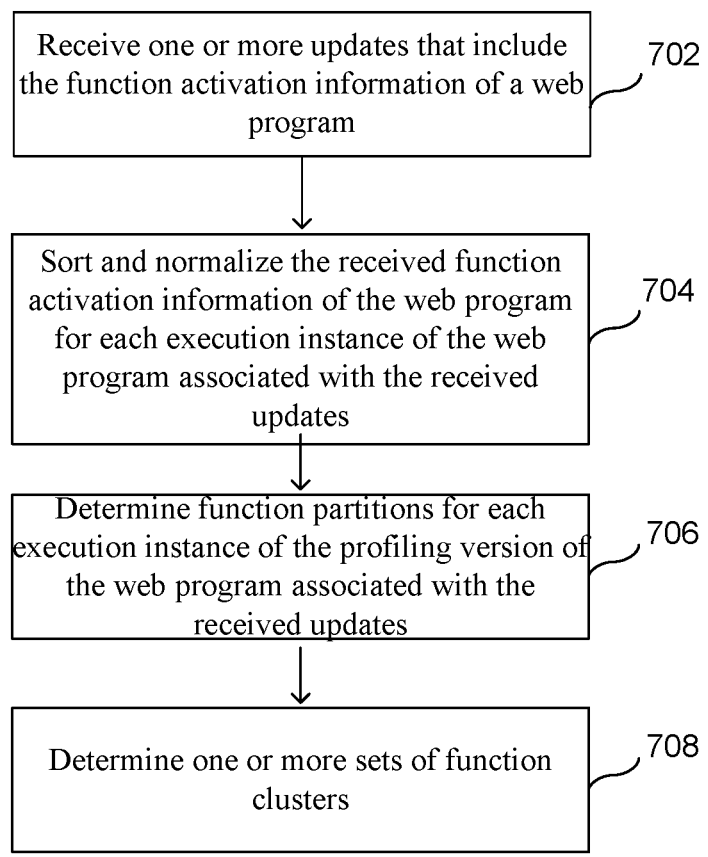
FIG. 7 is a flowchart illustrating an embodiment of a process for determining one or more sets of function cluster groupings of a web program.

FIG. 7 is a flowchart illustrating an embodiment of a process for determining one or more sets of function cluster groupings of a web program. In some embodiments, the process of FIG. 7 is at least in part implemented on server 104 of FIG. 1 and/or edge server 408 of FIG. 4. In some embodiments, the process of FIG. 7 is included in 516 of FIG. 5.

At 702, one or more updates that include the function activation information of a web program are received. In some embodiments, this information may be received on a periodical basis from various different senders. For example, timestamps of functions invoked while executing the profiling version of the web program generated in 604 of FIG. 6 are received. In some embodiments, the updates are received from various different senders that are executing the profiling version of the web program. In some embodiments, function activation information is received for a plurality of different web programs and function activation information for each specific web program is separately identified for analysis. In some embodiments, to avoid statistical pollution of the collected data due to multiple instances of data from single senders, the update is provided with an identifier that identifies an execution instance of a profiling version of the web program. For example, an identifier (e.g., unique randomly generated identifier) of a sender is provided along with the function activation information of the web program. In some embodiments, the update identifies the web program (e.g., URI location of the web program).

In some embodiments, the update includes contents of a data structure (e.g., array) storing timestamps associated with function identifiers that are received. For example, contents of the "refArray" array example discussed previously are received. In some embodiments, the received update is utilized to determine one or more function partition groupings that are temporally related. In some embodiments, each update includes a collection of function identifiers (e.g., assigned in 602 of FIG. 6) and associated timestamps of when the corresponding function was first activated/invoked for a specific execution instance of the profiling version of the web program. In some embodiments, an update is received in a JavaScript Object Notation (JSON) format. One such example update is:

"usage_map": [
  {"f_id": 0,
   "ts": 23452345},
  ...
  {"f_id": 561,
   "ts": 23452330}
]

Where the "f_id" field identifies the function identifier and the "ts" field identifies the corresponding timestamp. In some embodiments, the timestamp is expressed in milliseconds (e.g., the number of milliseconds since the start of execution of the web program).

At 704, the received function activation information of the web program for each execution instance of the web program associated with the received updates is sorted and normalized. For example, sorted and normalized function activation information is determined for each execution instance of the profiling version of the web program. In some embodiments, sorting the function activation information includes sorting function activations in time order. For example, entries that each includes a function identifier and a timestamp are sorted in ascending timestamp order.

For example, the following function activation information of function identifiers "0" through "5" and associated first activation timestamp pairs: {"0": 3411, "1": 3411, "2": 4053, "3": 6530, "4": 4052, "5": 6529}, is sorted by their timestamp values to obtain the ordering: {"0": 3411, "1": 3411, "4": 4052, "2": 4053, "5": 6529, "3": 6530}.

In some embodiments, normalizing the function activation information includes normalizing time values of the function activation information by subtracting from all the timestamps the value of the earliest timestamp. For example, relative differences between timestamp values in the sorted ordering are determined. In the previously sorted example, the normalized function activation information is: {"0": 0, "1": 0, "4":641, "2":1, "5":2476, "3":1}.

At 706, function partitions are determined for each execution instance of the profiling version of the web program associated with the received updates. In some embodiments, by analyzing the time gap between the function activations, the partition groupings of functions that have been initially invoked in close temporal proximity for each web program execution instance are identified. For example, if the determined timestamp difference of the normalized function activation information is greater than a threshold value, it is identified as the partition between the function groupings of the particular execution instance. In the previously sorted and normalized example function activation information, the threshold may be set at an arbitrary time interval of 500 milliseconds and because functions identified as "4" and "5" are associated with timestamp delta values greater than 500 ms, they denote a start of a new partition grouping in the ordered list of functions. Thus in this example, functions "0" and "1" belong to a first partition grouping, functions "4" and "2" belong to a second partition grouping, and functions "5" and "3" belong to a third partition grouping. In some embodiments, the temporally related function execution partition groupings are determined for each execution instance of the web program of interest identified in the received updates.

In some embodiments clustering may be determined dynamically, based on a required number of clusters. In such a clustering the threshold value alluded to above may be computed to arrive at the required number of clusters, rather then being an arbitrary time interval.

In some embodiments, when considering the time gap between function activations in the order list of initial function activations, the decision of whether or not to introduce a new partition grouping may be based on an estimation of the costs involved. For example, it is determined whether it would be less costly to include the next function in a current grouping or to mark a partition boundary and start a new function grouping. The cost of including in a current grouping may be the incremental time of transferring the text code content of the function within the same network response. The cost of not including the function in the current grouping may be the time cost involved in initiating and processing a response of a new network request. For example, if a network round trip costs 300 ms (e.g., time to request the function and receive the function), and the time gap between function activations is 1 sec, then it is likely to be better off introducing a new partition boundary and utilize the leftover 700 ms elsewise.

The function partition groupings of individual executions may vary across the different execution instances of the profiling version of the web program. In some embodiments, using the groupings determined for individual execution instances of the profiling version of the web program, correlated cluster groupings across multiple executions of the profiling version of the web program are determined.

At 708, one or more sets of function clusters are determined. For example, function partition groupings of different execution instances of the web program are correlated together to determine a single set of function cluster groupings. In some embodiments, different sets of function cluster groupings are determined for different types of execution platforms and programs. For example, the determined function partition groupings of different execution instances are separated based on the platform and/or program utilized to execute the execution instances and a separate set of function cluster groupings is determined for each of the separations. Examples of the different execution platforms and programs separately optimized include different operating system types, operating system versions, execution environments, web browsers, and the like. In some embodiments, the received update in 702 identifies the execution platform and/or program associated with the execution instance of the update. In some embodiments, the platform and/or program associated with the execution instance of the update is automatically determined (e.g., automatically determined using user agent information provided by a web browser).

In some embodiments, once the function partition groupings of the different execution instances of the profiling version of the web program to be correlated together are identified (e.g., execution instances of the same execution platform and/or program to be correlated to determine the set of function clusters for the platform/program), a function of the web program is determined to be in the same cluster grouping as another function if, for any given associated partition grouping, the function is most likely to be in the same grouping as the given other function. In some embodiments, the function cluster groupings of a set are disjoint groups. For example, a function may only belong to a single cluster of a set of clusters. In some embodiments, similarly, the function partition groupings of a set of a single execution instance are disjoint groups.

In some embodiments, probabilistic intersection of all the partitions in which a given function appeared in the different partition groups of execution instances is determined. For example, two functions $F_i$ and $F_j$ will be in the same cluster $C_x$ if $P(F_iF_j|C_x) > P(F_i|Cu) \cdot P(F_j|Cv)$ for disjoint clusters u and v, where $P(F_iF_j|C_x)$ is the probability that $F_i$ and $F_j$ are both in the cluster $C_x$ (e.g., probability $F_i$ and $F_j$ are both in the same partition grouping for different web program execution instances being correlated) and $P(F_i|Cu) P(F_j|Cv)$ is the probability that $F_i$ and $F_j$ are in different disjoint clusters u and v (e.g., probability $F_i$ and $F_j$ are both in the different disjoint partition groupings for different web program execution instances being correlated). In some embodiments, functions that have not been invoked (e.g., not specified in the received update and/or partition groupings as being invoked) are placed in a special cluster and/or not placed in a cluster.

In some embodiments, the cluster that includes functions that are likely to be first executed when the web program is initially loaded and activated is identified. For example, the functions belonging to the first partition grouping of the order list of function partition groupings are likely included in the cluster of functions likely to be first activated. This identification may be utilized to ensure direct inclusion of the functions of this cluster in optimized versions of the web program since these functions are likely to be requested first.

In some embodiments, once one or more sets of function clusters (e.g., a different set of function clusters for each different execution platform and/or program) are determined, the specification of the sets of the clusters are stored in a data structure (e.g., table, database, etc.) for retrieval. For example, when a client executing an optimized version of the web program requests contents of a function, the appropriate set of function clusters for the request is identified and the stored specification of the identified set of function clusters is retrieved from the data structure. Using the specification of the identified set of function clusters, the cluster that includes the requested function may be identified and the contents of all of the functions belonging to the cluster of the requested function may be provided in response to the request.

Figure 8:
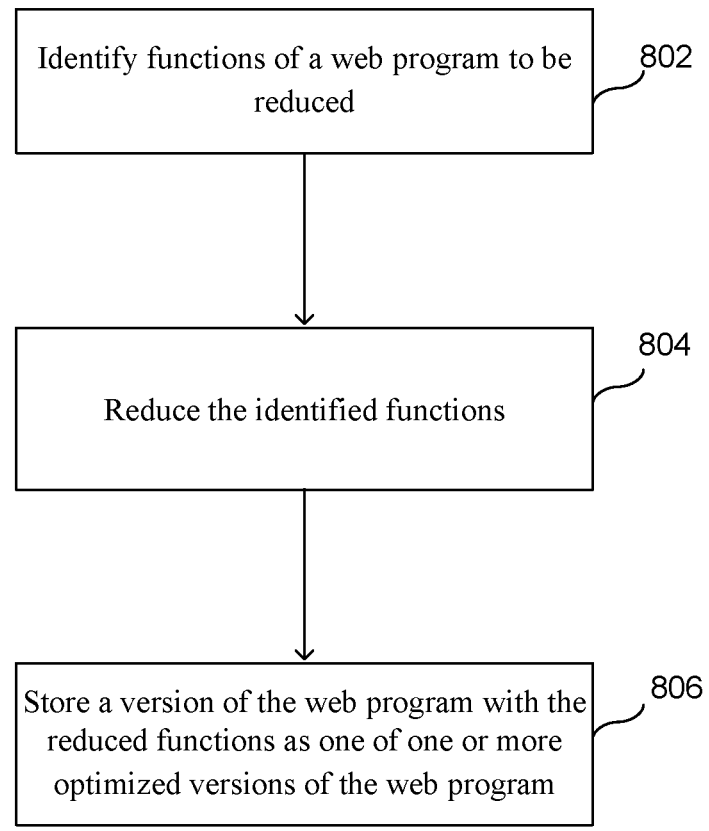
FIG. 8 is a flowchart illustrating an embodiment of a process for generating an optimized version of a web program.

FIG. 8 is a flowchart illustrating an embodiment of a process for generating an optimized version of a web program. In some embodiments, the process of FIG. 8 is at least in part implemented on server 104 of FIG. 1 and/or edger server 408 of FIG. 4. In some embodiments, the process of FIG. 8 is included in 516 of FIG. 5. In some embodiments, the generated optimized version of the web program is specific to a particular execution platform (e.g., a particular operating system) and/or program (e.g., particular web browser type/application). For example, for the same web program, different optimized versions may be generated for different users, platforms and/or programs. In some embodiments, the process of FIG. 8 may be repeated to generate different optimized versions for the same web program and/or generate optimized versions for different web programs.

At 802, functions of a web program to be reduced are identified. In some embodiments, identifying the functions to be reduced include identifying content of functions that are likely not needed immediately when executing the web program. For example, by removing contents of the functions from the web program, a smaller version of the web program may be generated as the optimized version to reduce the bandwidth and processing requirements of initially receiving and processing the web program. In some embodiments, reducing a function includes replacing at least a portion of the original code contents of the function with alternate code that when executed obtains the contents (e.g., from a remote server) if the contents have not been already obtained.

In some embodiments, functions of the web program to be reduced are functions belonging to function clusters (e.g., clusters determined in 708) associated with the optimized version being generated (e.g., clusters for the specific execution platform and/or program of the optimized version being generated). In some embodiments, functions that are likely to be first executed (e.g., functions of a cluster identified in 708) when the web program is executed are not to be reduced. For example, because these functions are likely to be utilized and requested right away, these functions are included in the optimized version without modification. In some embodiments, functions that do not belong to a function cluster and/or that are placed in a special cluster of functions that have not been observed as being invoked are identified to be reduced.

In some embodiments, functions that are less than a threshold size are not reduced. For example, reducing a small sized function may actually generate a larger function due to the replacement code that will fetch the contents of the reduced function as needed. Additionally, any benefit gained from minor reduction in size of a function may be outweighed by the cost of generating an additional request to fetch the contents when needed. The threshold size may be preconfigured, configurable and/or dynamically determined/modified. In some embodiments the decision whether or not to reduce a function is based on comparing the reduced version with the original. If the latter is smaller, then reduction may not be performed on that function.

At 804, the identified functions are reduced. In some embodiments, reducing a function includes replacing at least a portion of the function with a replacement stub that will, when invoked, obtain the original replaced content, replace itself with the obtained content, and then execute the obtained content. For example, the replaced original function content is made available as a string that must be incorporated into the function definition using the "eval" JavaScript primitive function.

In some embodiments, the replacement text used to update stub functions is a string value. This string value is loaded as textual data and the "eval" primitive of JavaScript is used to convert the string into an executable function. The use of the "eval" primitive ensures that correct scope of variables is maintained by the JavaScript run-time. This translation has the property that, after processing the "eval" primitive, no obvious trace of the stub function remains. This may ensure minimal long-term overhead in performing the optimization. Note that, in this case, the text of the function table entry is identical to the original function. In situations where the original function had internal function definitions the text will be the transformed code rather than the original. Additionally, the function is being treated as a variable of the same name.

When a function is declared as a JavaScript FunctionStatement, reducing the function includes changing the FunctionStatement to a normal declaration of a variable using the same name as the function and where the initial value of the variable is a function where the first call to the function will 'erase' itself into an equivalent of the original FunctionStatement. For example, the FunctionStatement:

function Fact(n){if(n<1) return 1; else return n*Fact(n−1);} is replaced by a variable declaration in the form of:

var Fact=function(n){
  Fact=eval(_Ft(34))//assuming Fact maps to 34
  return Fact(n)
↑

The body of this function overwrites the "Fact" variable with the original function—as loaded from the original server—with the following code:

Fact=eval(_Ft(34))

where the value of the expression _Ft(34) is the string value "function Fact(n){if(n<1) return 1; else return n*Fact(n−1)}"

The effect of this assignment is that the next time "Fact" is invoked, a function that is equivalent to the original Fact function will be invoked. The last action of the stub is to invoke the newly loaded function, with the original arguments:

return Fact(n)

In some embodiments, this form of stub may be utilized whenever it is possible to infer that a function expression is assigned to a variable. For example, the assignment:

F=function (N){return . . . } may be rewritten to:

F=function (N){F=Cache (34); return F(N)}

This translation may allow for the possibility that the variable "F" may be re-assigned.

When a function is defined using the FunctionExpression form (e.g., a lambda expression), it may not always be able to 'find' a suitable variable in which to record the function. In this case, in some embodiments, a special internal variable is utilized to store the actual function value. For example, in the expression:

map (A, function (X){return X+X})

the internal lambda is not associated with any variable and a specific variable is introduced to act as a pointer to the actual function. The map expression may be replaced with:

map (A,
  (function( ){
    var F;
    return function (X){
      if (_F==undefined)
        _F=eval(_Ft(34));
      return _F(X);
    })( ))

The local variable "_F" is initially undefined. The first time the function is called "_F" is assigned to the result of performing "eval" on the string definition as loaded from the server. Then, and thereafter, the original function is accessed via a call to "_F". The particular form of this translation may ensure that the introduced variable "_F" is associated with the lambda expression itself —rather than some other scope. This may be necessary to ensure that each evaluation of the lambda expression is associated with a separate instance of the function.

In some embodiments, the name chosen for the internal variable, "_F" in the example above, is chosen in such a way as to guarantee that no other variable has the same name. This is to ensure no conflict with any variables declared within the original JavaScript program.

After initial evaluation, what remains may be code that is equivalent to:

```
function (X){
    if(_F123==undefined)
        ; //Never executed
    return _F123 (X);
}
```

This may be more expensive, on a per invocation basis, than the FunctionStatement form because there is an additional test and an additional function call. The test can be eliminated by using a double-stub translation:

```
map (A,
    (function( ){
        var _F=function (X){
            _F=eval(_Ft(34));
            return _F (X);
        }
        return function (X){
            return _F(X);
        };})( ))
```

This translation eliminates the test at the expense of a more complex (and maybe more expensive) stub.

In some embodiments, a function is invoked as a method call. For example in the call "Ob. F (n)" the call to function "F" has an additional argument—the object itself. To address this, a different form of call may be utilized in the stub. For example, the statement: "return _F (X);" should instead be: "return _F.call (this, X);". In some embodiments, this form of call is utilized if the body of the function references "this".

In some embodiments, functions that reference specific features of the JavaScript programming language—such as the 'arguments' feature—may require the use of another form of function call. For example, the function

```
function argRef( ){
    if(arguments[0]=="Hi")
        return arguments[1];
}
``` would require a stub replacement:

```
var argRef=function( ){
    argRef=eval(_Ft(35))//Assuming that argRef maps to 35
    return argRef.apply(this,arguments)
}
```

In some embodiments, a JavaScript program may use certain non-standard features of JavaScript, including the ability to programmatically construct a string representation of a function source. Using such a feature on replaced functions may result in an incorrect rendering of the function. In some embodiments, it is possible to construct a special 'toString' function that can use similar mechanisms to reconstruct the original source of the function. In some embodiments, the toString' method is overridden/replaced/redefined to provide special handling of the toString' method/function call for a reduced/stubbed function.

Consider the JavaScript source:

```
function mega( ){
    function fact(N){
        if (N<=1)
            return 1;
        else
            return fact (N-1)*N;
    }
};
```

After a basic transformation, this program may be transformed to code that stub-ifies the mega function:

```
function mega( ){
    return mega_bg0Fun( );
}
function mega_bg0Fun( ){
    mega_bg0Fun=eval(Ca_bg0Fun(0, 'mega'));
    return mega_bg0Fun( );
}
```

However, a call to mega.toString( ) does not result in a string representation of the original mega function; instead it may result in the source of the stub function itself: "function mega( ){return mega_bg0Fun( );}"

In some embodiments, it is possible to replace the toString method of stubbed functions such that invoking it will result in the original source. For example, we can replace the toString method in the mega function with the function:

mega.toString=stringerbg0Fun('mega',0);

where stringerbg0Fun returns a function replacement for toString. The stringerbg0Fun function uses the same function table as the call to the mega function to reconstruct the source. In some embodiments, this function may be given by:

```
function stringerbg0Fun(Name,Id){
    return function( ){return Ca_bg0Fun(Id)})
}
``` where Ca_bg0Fun is the function that accesses the original source texts of functions that have been stubbed. However, this does not account for the potential for functions defined within mega function to be also transformed. The result of invoking toString function on the above mega function may be:

"function mega( ){function fact(N){\n return fact_bg0Fun (N);\n} fact. toString=stringerbg0Fun('fact',1); function fact_bg0Fun(N){\n fact_bg0Fun=eval(Ca_bg0Fun (1,'fact'));\n return fact_bg0Fun(N);\n}}"

Although the overall structure of mega function is correct above, the internal functions are still in their stubbed form.

A more complete implementation of stringerbg0Fun uses a series of regular expressions to look for stubbed functions within a source string and recursively replaces them with their source definitions. This version of stringerbg0Fun may be given by:

```
function stringerbg0Fun(Name,Id){
    return function( ){return toStrbg0Fun(Name,Id)})
}
var RE0=/\(function\s*\(\)\s*\{[^{  }]*?\bfunction\b\([^)]*\)
    \s*{[^{  }]*?eval\(Ca_bg0Fun\((\d+),  \s*'([^']*?)'\)\)
    [\s\S]*?; \s*return FFbg0Fun; \s*}\(\)\)/;
var RE1=/function\s*(\w+)\s*(?:\([^\)]*\))\s*\{[\s\S]
    *return\s+(?:[^{  }]*)(\1_(?:)bg0Fun)[\s\S]*?; \s*}[s\S]
    *?function\s+\2\b[\s\S]*?eval\   (Ca_bg0Fun\((\d+),
    \s*'\1'\)\) (?:[^{  }]*})/;
function toStrbg0Fun(Name,Key){
    var Tx="function
"+Name+/\(function\s*(\w*\([^\)]*\)\{[\s\S]*\})\)$/
    .exec(C a_bg0Fun(Key))[1];
    while(true){
        if(RE0.test(Tx))
            Tx=Tx.replace(RE0,
```

```
        function(O,Ky,Nm){return toStrbg0Fun('',Ky)
        });
    else if(RE1.test(Tx))
        Tx=Tx.replace(RE1,
            function(O,Nm,_,Ky){return toStrbg0Fun(Nm,
            Ky)});
    else
        return Tx;
    }
}
```

The regular expressions in this code are used to recover the stub-ified functions and replace the stubs with the original function source.

In some embodiments, a combined stub that supports the invocation of functions as well as the toString renderer is used. For example, the complete stub produced for the previous mega function example may be:

```
function mega( ){
    return mega_bg0Fun( );
}
mega.toString=stringerbg0Fun('mega', 0);
function mega_bg0Fun( ){
    mega_bg0Fun=eval(Ca_bg0Fun(0, 'mega'));
    return mega_bg0Fun( );
}
```

In some embodiments, JavaScript functions may be utilized to construct objects—using the new F( ) notation. However, functions themselves are also objects in JavaScript. As such, they can be assigned additional properties. For example, in the code fragment:

```
function F( ){
    this.X=F.myProperty
}
F.myProperty="fooBar"
var f=new F( )
console.log(f.X)
``` the F function—distinct from any objects created using F—has the additional property myProperty assigned with the string value "fooBar". Executing this program results in the display of "fooBar" on the console. This has the potential to interfere with the transformation as the original function objects are replaced during execution. This may be especially a problem when function properties are assigned before the function is first invoked. Furthermore, some properties cannot be modified after creation, some cannot be copied and some properties are read-only. The effect is that a naïve approach to function replacement does not respect function properties.

In some embodiments, to handle function properties, an extra level of indirection is establish in the transformed functions. For example, instead of replacing functions such as Fact function below with:

```
var Fact=function (n){
    Fact=eval(Ca_bg0Fun(34))
    return Fact(n)
}
``` an intermediate Fact34 function is introduced, which is replaced during evaluation:

```
function Fact(n){
    return Fact34 (n)
}
var Fact34=function(n){
    Fact34=eval(Ca_bg0Fun(34))
    return Fact34 (n)
}
```

In above, Fact34 is a generated name that does not occur elsewhere in the program. Because there is an extra indirection between the original function and the transformed function, any properties that are set on the function may remain accessible to the transformed code.

In some embodiments, reducing the JavaScript program includes inserting code to implement a function table that stores obtained content of functions. For example, the function table may be an array of function definitions represented as strings. A given function is identified within the table by its function identifier (e.g., determined in 602 of FIG. 6). Initially, the function table may be typically not specified completely in the optimized version of the web program. Instead, function content entries of the table are dynamically loaded as needed. For example, the "_Ft" function below may be utilized to load back function contents that have been replaced in the optimized version. An example implementation of the "_Ft" function is below.

```
var ft=[ ]
function _Ft(n){
    if(!ft[n])
        eval(httpLoad("system-url?function-id="+n));
    return ft[n]; //should be loaded after the eval
}
```

In this example, the call to the function "httpLoad ("system-url?function-id="+n)" results a request to a remote server to obtain the definition associated with the function identified by function-id "n". In response, the definitions of all functions belonging to the function cluster that includes the requested function is received. By performing "eval" on this fragment, all the functions in this function cluster are loaded into the function table variable "ft"—including the definition of the requested function. After this evaluation, the "ft" variable will have an appropriate value for the "n"th index and accessing it will succeed without the "httpLoad".

At 806, a version of the web program with the reduced functions is stored as one of one or more optimized versions of the web program. This optimized version may be provided in 508 of FIG. 5.

Figure 9:
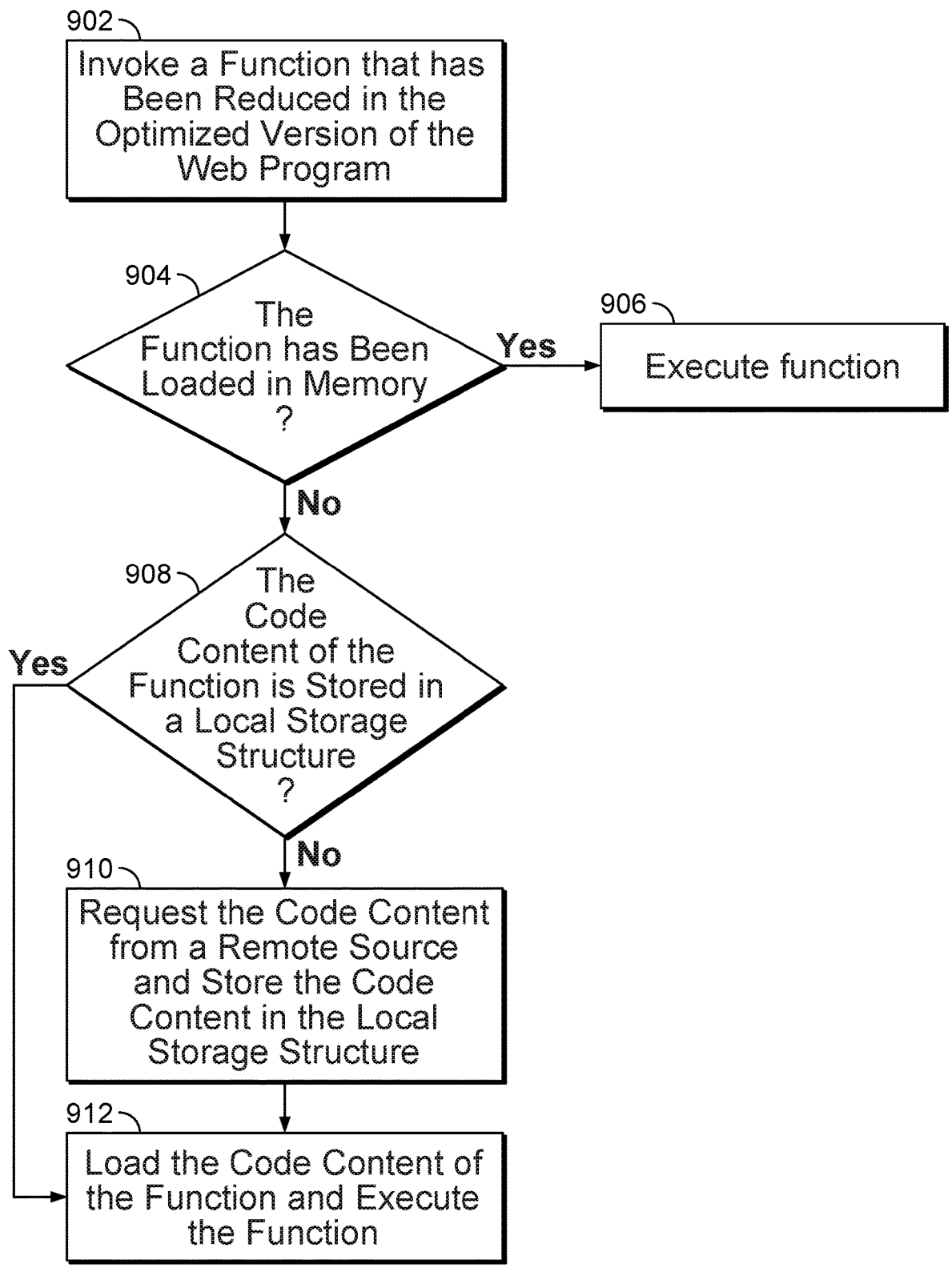
FIG. 9 is a flowchart illustrating an embodiment of a process for invoking a reduced function of an optimized version of a web program.

FIG. 9 is a flowchart illustrating an embodiment of a process for invoking a reduced function of an optimized version of a web program. In some embodiments, the optimized version is the version generated using the process of FIG. 8. In some embodiments, the process of FIG. 9 is at least in part implemented on client 401 of FIG. 4.

At 902, a function that has been reduced in the optimized version of the web program is invoked. For example, the function reduced in 804 of FIG. 8 is invoked when a client that received the optimized version of the web program provided in 508 of FIG. 5 is executing the optimized version of the web program.

At 904, it is determined whether the function definition has been loaded in memory.

If at 904 it is determined that the definition of the function has been loaded in memory, at 906 the function is executed.

If at 904 it is determined that the code content function has not been loaded in memory, at 908 it is determined whether the code content of the function is stored in a local storage structure. For example, an array stores code content of functions and the array is checked to verify whether the array includes code content of the function. The storage structure may be indexed by an identifier of the function to obtain the code content of the function. The identifier may be the identifier assigned in 602 of FIG. 6.

If at 908 it is determined that the code content of the function is not stored in the local storage structure, at 910 the code content is requested from a remote source and stored in the local storage structure. For example, a network request is made to a server (e.g., to server 408 of FIG. 4) for the code content. In some embodiments, in response, the remote source provides not only the requested content of the function but also provides contents of associated functions (e.g., contents of all functions of the function cluster that includes the requested function). The received function contents are stored in the local data structure. For example, in the event contents of other functions are received, contents of the other functions are stored in different entries of the data structure indexed by their respective function identifiers. In some embodiments, requesting the code content of the function includes providing an identifier of the web program (e.g., URL/URI), an identifier of the function of the desired content, an identifier of the platform (e.g., operating system, device type, etc.), and an identifier of the requesting program (e.g., user agent information of a web browser). These identifiers may uniquely identify the corresponding set of function clusters to be utilized (e.g., matches the optimized version of the web program being executed).

If at 908 it is determined that the code content of the function is stored in the local storage structure or after 910, at 912, the code content of the function is loaded and the function is executed.

Figure 10:
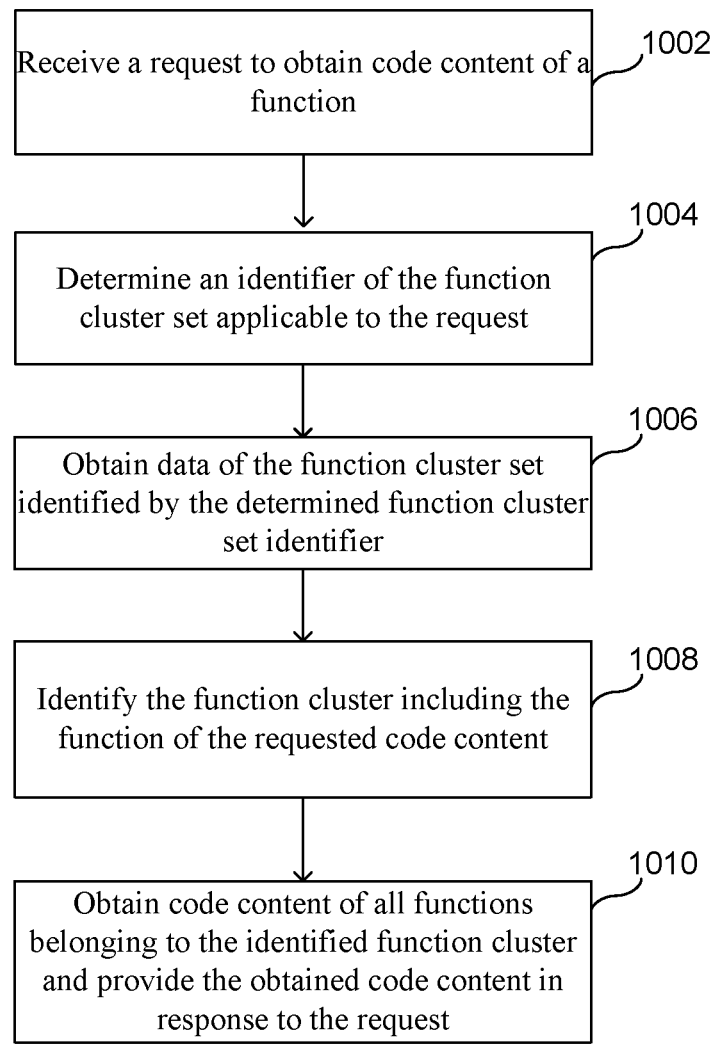
FIG. 10 is a flowchart illustrating an embodiment of a process for providing function content requested by an optimized version of a web program.

FIG. 10 is a flowchart illustrating an embodiment of a process for providing function content requested by an optimized version of a web program. In some embodiments, the optimized version is the version generated using the process of FIG. 8. In some embodiments, the process of FIG. 10 is at least in part implemented on server 104 of FIG. 1 and/or edge server 408 of FIG. 4.

At 1002, a request to obtain code content of a function is received. For example, the function is a function that has been reduced/optimized in 804 of FIG. 8. In some embodiments, the request is the request provided in 910 of FIG. 9.

At 1004, an identifier of the function cluster set applicable to the request is determined. In some embodiments, there exists different sets of one or more function cluster groupings (e.g., sets of clusters determined in 708 of FIG. 7) and the set of clusters applicable to the request is determined. For example, various different sets of function clusters may have been determined for different web programs, different optimized versions of the same web program, different platforms, and/or different applications/programs. In some embodiments, the identifier of the function cluster set applicable to the request is determined using data provided in the received request. For example, the request identifies an identifier of the web program (e.g., URL/URI), an identifier of the platform (e.g., operating system, device type, etc.) and/or an identifier of the requesting program (e.g., user agent information of a web browser) and using the provided identifiers, the identifier of the applicable function cluster set is determined.

At 1006, data of the function cluster set identified by the determined function cluster set identifier is obtained. For example, there exists a storage/cache of function cluster set data and the function cluster set data corresponding to the identifier is obtained.

At 1008, the function cluster including the function of the requested code content is identified. For example, the function cluster that includes the function identified by a received function identifier is located using a mapping between function identifiers and the associated function cluster. In some embodiments, the function of the requested code content may not belong to a function cluster. In some embodiments, the function of the requested code content may not be temporally associated with execution of other functions.

At 1010, code content of all functions belonging to the identified function cluster is obtained and provided in response to the request. In some embodiments, the code contents of the functions are included in the data of the function cluster set obtained in 1006 from the cache and/or storage. In some embodiments, only the requested code content is provided. For example, only the requested code content of the function is provided because the identified function cluster may only include one function, the requested function may not belong to a cluster, and/or the requested function may belong to a special cluster/grouping of functions that have not been observed to be executed when the web program was analyzed for function grouping.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a first request for a web program;
    providing a profiling version of the web program in response to the first request for the web program, wherein the profiling version has been generated by inserting tracking code into the web program, and the tracking code allows individual tracking and profiling of each of a plurality of different portions included in the web program;
    analyzing, using a processor, at least the information from the tracking code for each of the plurality of different portions gathered during an execution of the profiling version of the web program to identify a selected portion from the plurality of different portions of the web program to be reduced in size by being replaced with a replacement reference that corresponds to a location where the identified portion can be dynamically obtained using the replacement reference for execution;
    generating, using the processor, a reduced version of the web program without the identified portion by replacing the identified portion with at least the replacement reference, comprising:
        sorting, in time order, normalized function activation information of execution instances of the profiling version of the web program associated with received updates;
        determining function partitions for the execution instances of the profiling version of the web program based on a determined timestamp difference of the normalized function activation information being greater than or equal a threshold value;
        determining one or more set of function clusters based on the function partitions; and
        storing the one or more set of function clusters in a data structure;
    receiving at a same component that received the first request, a second request for a web program; and
    providing in response to the second request for the web program, the reduced version of the web program that has been generated using the information gathered during the execution of the profiling version of the web program provided in response to the first request for the web program.

2. A computer program product, the computer program product being embodied in a non-transitory computer readable storage medium and comprising computer instructions for:
  receiving a first request for a web program;
  providing a profiling version of the web program in response to the first request for the web program, wherein the profiling version has been generated by inserting tracking code into the web program, and the tracking code allows individual tracking and profiling of each of a plurality of different portions included in the web program;
  analyzing at least the information from the tracking code for each of the plurality of different portions gathered during an execution of the profiling version of the web program to identify a selected portion from the plurality of different portions of the web program to be reduced in size by being replaced with a replacement reference that corresponds to a location where the identified portion can be dynamically obtained using the replacement reference for execution;
  generating a reduced version of the web program without the identified portion by replacing the identified portion with at least the replacement reference, comprising:
    sorting, in time order, normalized function activation information of execution instances of the profiling version of the web program associated with received updates;
    determining function partitions for the execution instances of the profiling version of the web program based on a determined timestamp difference of the normalized function activation information being greater than or equal a threshold value;
    determining one or more set of function clusters based on the function partitions; and
    storing the one or more set of function clusters in a data structure;
  receiving at a same component that received the first request, a second request for a web program; and
  providing in response to the second request for the web program, the reduced version of the web program that has been generated using the information gathered during the execution of the profiling version of the web program provided in response to the first request for the web program.

3. A system, comprising:
  a communication interface configured to receive a first request for a web program and receive a second request for the web program, wherein the same communication interface receives both the first request for the web program and the second request for the web program; and
  a processor coupled with the communication interface and configured to:
    provide a profiling version of the web program in response to the first request for the web program, wherein the profiling version has been generated by inserting tracking code into the web program, and the tracking code allows individual tracking and profiling of each of a plurality of different portions included in the web program;
    analyze at least the information from the tracking code for each of the plurality of different portions gathered during an execution of the profiling version of the web program to identify a selected portion from the plurality of different portions of the web program to be reduced in size by being replaced with a replacement reference that corresponds to a location where the identified portion can be dynamically obtained using the replacement reference for execution;
    generate a reduced version of the web program without the identified portion by replacing the identified portion with at least the replacement reference, comprising to:
      sort, in time order, normalized function activation information of execution instances of the profiling version of the web program associated with received updates;
      determine function partitions for the execution instances of the profiling version of the web program based on a determined timestamp difference of the normalized function activation information being greater than or equal a threshold value;
      determine one or more set of function clusters based on the function partitions; and
      store the one or more set of function clusters in a data structure; and
    provide in response to the second request for the web program, the reduced version of the web program that has been generated using the information gathered during the execution of the profiling version of the web program provided in response to the first request for the web program.

4. The system of claim 3, wherein the processor is further configured to cache the reduced version of the web program.

5. The system of claim 3, wherein providing the reduced version of the web program includes selecting the reduced version among a plurality of different reduced versions of the web program.

6. The system of claim 3, wherein the processor is further configured to receive a request for the identified portion of the web program from a client that requested the web program.

7. The system of claim 6, wherein the processor is further configured to identify a function cluster that includes a function of the identified portion of the web program.

8. The system of claim 7, wherein the processor is further configured to provide contents of a plurality of functions of the function cluster in response to the second request for the identified portion of the web program.

9. The system of claim 3, wherein a function of the web program is assigned a unique replacement identifier.

10. The system of claim 3, wherein generating the reduced version includes replacing the identified portion with a function call to a replacement function that is replaced with at least the replacement reference.

11. The system of claim 3, wherein the processor is further configured to receive a report that specifies when one or more functions of the web program have been first invoked when executing the profiling version of the web program.

12. The system of claim 11, wherein the processor is further configured to use the report to determine one or more disjoint groupings of functions of the web program that are likely to be initially invoked temporally close to one another.

13. The system of claim 3, wherein the web program includes program code specified using a web programming language.

14. The system of claim 3, wherein the web program is a resource of a webpage.

15. The system of claim 3, wherein the generating the reduced version of the web program includes overriding of a toString method.

16. The system of claim 3, wherein the system is included in an edge server of a content delivery network.

17. The system of claim 3, wherein the first request is provided by a web browser.

18. The system of claim 3, wherein the portion of the web program includes content of a function of the web program.

19. The system of claim 3, wherein the location is a network address.

20. The system of claim 3, wherein the replacement reference includes code to obtain the identified portion of the web program when requested and implement the code.

21. The system of claim 3, wherein the replacement reference includes code to reconstruct an original source text of the web program when requested.

22. The system of claim 3, wherein the reduced version is smaller in size than an original version of the web program.

\* \* \* \* \*